United States Patent
Hellmann et al.

(10) Patent No.: US 9,755,673 B2
(45) Date of Patent: Sep. 5, 2017

(54) DISTANCE TO VSWR FAULT MEASUREMENT

(71) Applicant: Nokia Solutions and Networks Oy, Espoo (FI)

(72) Inventors: Jan Hellmann, Munich (DE); Marko Fleischer, Unterhaching (DE); Norbert Hueller, München (DE); Christian Reichl, Hirschau (DE); Michael Kronwald, Puchheim (DE)

(73) Assignee: Nokia Solutions and Networks Oy, Espoo (FI)

( * ) Notice: Subject to any disclaimer, the term of this patent is extended or adjusted under 35 U.S.C. 154(b) by 139 days.

(21) Appl. No.: 14/437,908

(22) PCT Filed: Oct. 25, 2012

(86) PCT No.: PCT/EP2012/071143
§ 371 (c)(1),
(2) Date: Apr. 23, 2015

(87) PCT Pub. No.: WO2014/063736
PCT Pub. Date: May 1, 2014

(65) Prior Publication Data
US 2015/0295598 A1     Oct. 15, 2015

(51) Int. Cl.
*H04J 1/16* (2006.01)
*H04B 1/04* (2006.01)
*H04B 17/10* (2015.01)
*H04L 5/14* (2006.01)

(52) U.S. Cl.
CPC ......... *H04B 1/0466* (2013.01); *H04B 17/101* (2015.01); *H04B 17/103* (2015.01); *H04L 5/14* (2013.01)

(58) Field of Classification Search
CPC .. H04B 17/101; H04B 17/103; H04B 1/0466; H04L 5/14
See application file for complete search history.

(56) References Cited

U.S. PATENT DOCUMENTS 6,023,612 A *    2/2000   Harris .................. H01P 1/2138
                                                                                                               330/295
9,385,820 B2      7/2016   Barabash et al.
(Continued)

FOREIGN PATENT DOCUMENTS

CN        101958756 A      1/2011
CN        102435913 A      5/2012
(Continued)

*Primary Examiner* — Kan Yuen
(74) *Attorney, Agent, or Firm* — Harrington & Smith (57) ABSTRACT

The present invention addresses apparatuses, methods and computer program product for providing improved distance to fault measurement for voltage standing wave ratio (VSWR) on antenna line in networks. An embodiment of the present invention comprises the steps of transmitting a signal to a line to be tested, capturing a forward signal of the signal, capturing a reverse signal of the signal, separating the reflection of the signal in time domain via cross correlation of the forward signal and the reverse signal, and detecting a distance to fault in the line by searching and processing maximum peak position of the captured and separated signals.

21 Claims, 6 Drawing Sheets

(56) References Cited

U.S. PATENT DOCUMENTS

| | | | |
|---|---|---|---|
| 2004/0019443 A1* | 1/2004 | Jones | H04B 3/493 |
| | | | 702/79 |
| 2005/0140376 A1 | 6/2005 | Brown et al. | 324/538 |
| 2005/0203711 A1* | 9/2005 | Taylor | G01R 27/04 |
| | | | 702/59 |
| 2005/0245222 A1* | 11/2005 | Lehnert | H04B 17/21 |
| | | | 455/226.1 |
| 2010/0290035 A1* | 11/2010 | Wang | G01M 11/3118 |
| | | | 356/73.1 |
| 2011/0050245 A1* | 3/2011 | Sato | G01R 31/11 |
| | | | 324/534 |
| 2012/0249165 A1* | 10/2012 | Mcerlean | A61B 18/1815 |
| | | | 324/642 |

FOREIGN PATENT DOCUMENTS

| | | |
|---|---|---|
| CN | 102435916 A | 5/2012 |
| CN | 102711649 A | 10/2012 |

\* cited by examiner

DISTANCE TO VSWR FAULT MEASUREMENT

FIELD OF THE INVENTION

The present invention generally relates to wired or wireless communication networks, and more specifically relates to a method, apparatus and computer program product for enabling improved distance to fault measurement for voltage standing wave ratio (VSWR) on antenna line in networks.

BACKGROUND

In current time division multiplex/frequency division duplex (TDD/FDD) network radio equipment, such as a base transceiver station (BTS), a mismatch on the antenna transmission line causes transmission loss and standing waves. This mismatch can be expressed in terms of a voltage standing wave ratio (VSWR) and a distance to the fault and serves as input to start on-site maintenance actions.

In general, VSWR may be determined from the voltage measured along a transmission line leading to an antenna. Thereby, VSWR is the ratio of the maximum amplitude of a standing wave to the minimum amplitude of a standing wave. In case an antenna is not matched to the transmitter, power is reflected, which causes a reflected voltage wave, creating standing waves along the transmission line.

However, the on-site location of a VSWR fault requires disconnecting of the antenna line from the base transceiver station (BTS) and connecting of external measurement equipment to the antenna line and/or visual inspection.

Consequently, an unknown location of the fault requires expenditure of time to detect. Further, appropriate measurement equipment to detect the fault requires investments.

SUMMARY OF THE INVENTION

Therefore, in order to overcome the drawbacks of the prior art, it is an object underlying the present invention to provide an optimization for distance to fault measurement. In particular, it is an object of the present invention to provide a method, apparatus and computer program product for enabling improved distance to fault measurement for voltage standing wave ratio (VSWR) on antenna line in networks.

According to a first aspect of the present invention, there is provided a method, comprising transmitting a signal to a line to be tested, capturing a forward signal of the signal, capturing a reverse signal of the signal, separating the reflection of the signal in time domain via cross correlation of the forward signal and the reverse signal, and detecting a distance to fault in the line by searching and processing maximum peak position of the captured and separated signals.

According to a second aspect of the present invention, there is provided an apparatus, which comprises a transmission means adapted to transmit a signal to a line to be tested, a capturing means adapted to capture a forward signal of the signal and a reverse signal of the signal, a splitting device adapted to separate the reflection of the signal in time domain via cross correlation of the forward signal and the reverse signal, and a detection means adapted to detect a distance to fault in the line by searching and processing maximum peak position of the captured and separated signals.

According to a third aspect of the present invention, there is provided a computer program product comprising computer-executable components which, when the program is run, are configured to carry out the method according to the first aspect.

This enables improved distance to fault measurement for voltage standing wave ratio (VSWR) on antenna line in networks directly done by the connected base transceiver station (BTS).

According to certain embodiments of the present invention, a leakage from the forward to the reverse path is estimated, and the leakage is canceled from the captured reverse reception data.

According to certain embodiments, estimating the leakage and its cancellation is carried out via an adaptive filter.

According to further embodiments, detecting the distance to fault is performed by processing a voltage standing wave ratio.

According to certain embodiments, separating the reflection of the signal is performed via a splitting device.

According to certain embodiments, the splitting device is a coupler or a circulator.

According to certain embodiments, the splitting device is located at an input or an output of a duplex filter.

According to certain embodiments, the line to be tested is an antenna line and the splitting device is located at an antenna output.

According to further embodiments, the forward signal and the reverse signal are simultaneously captured.

According to further embodiments, detecting the distance to fault is directly measured by a base transceiver station.

According to further embodiments, the distance to fault information is transmitted to a maintenance network element.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Basically, according to certain embodiments, the present invention intends the direct use of the connected time division multiplex/frequency division duplex TDD/FDD network radio equipment, such as a base transceiver station BTS with VSWR detection to remotely locate the VSWR fault on the antenna line. The remotely measured distance to the fault serves as information in advance to plan and perform on-site repair actions.

According to certain embodiments, the invention uses VSWR detection based on correlation in time domain. From the correlation, the distance to the fault can be derived and presented to operation and maintenance network elements.

Thereby, the distance to VSWR fault detection is derived from the correlation of forward and reverse signals. The reverse signal is separated from the forward signal by a splitting device, such as a circulator or a coupling device as non-limiting examples, which may be located at the input or output of a Duplex Filter.

During measurement, forward and reverse signals have to be simultaneously captured. The capturing uses hardware resources, which are also shared with other digital signal processing modules.

That way, the detection of the distance to a VSWR fault on the antenna line is directly measured by TDD/FDD network radio equipment (BTS). The result is presented to operation and maintenance network elements (service).

Figure 1:
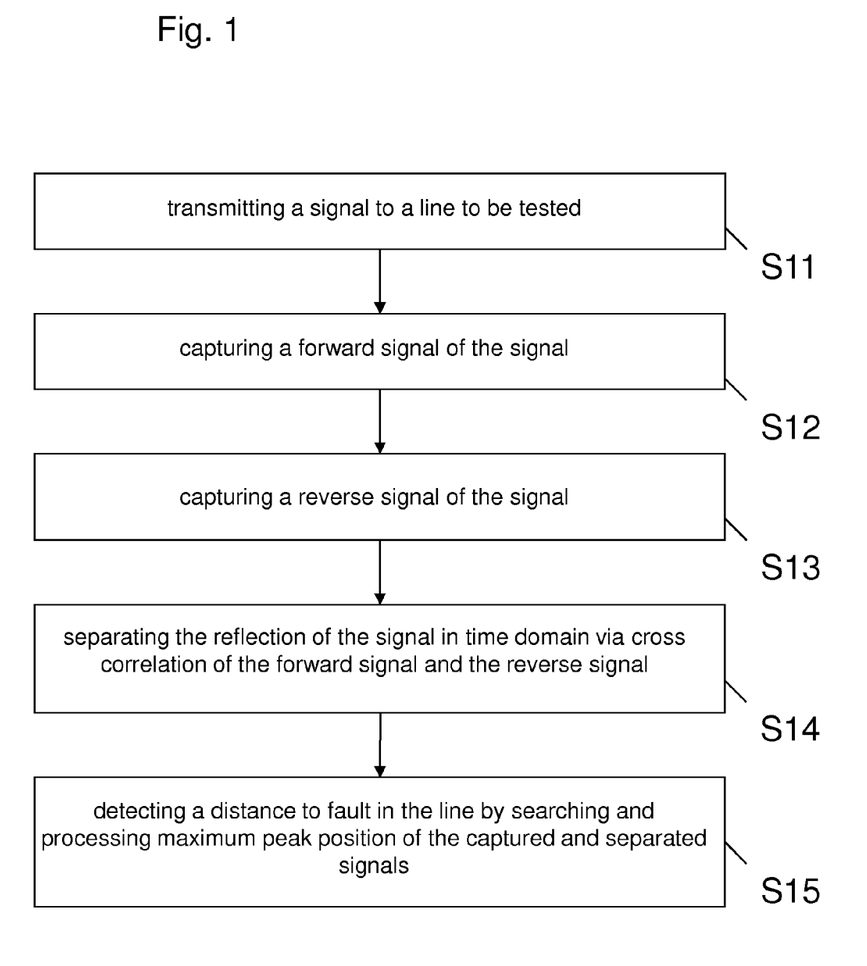
FIG. 1 shows a principle configuration of an example for a method according to certain embodiments of the present invention.

FIG. 1 shows a principle flowchart of an example for a method according to certain embodiments of the present invention.

In Step S11, a signal to a line to be tested is transmitted.
In Step S12, a forward signal of the signal is captured.
In Step S13, a reverse signal of the signal is captured. According to certain embodiments of the present invention, Steps S12 and S13 are simultaneously done.

In Step S14, the reflection of the signal is separated in time domain via cross correlation of the forward signal and the reverse signal. Additionally, according to certain embodiments of the present invention the cancelation of the leakage from forward to the reverse path is done.

In Step S15, a distance to fault in the line is detected by searching and processing maximum peak position of the captured and separated signals.

Figure 2:
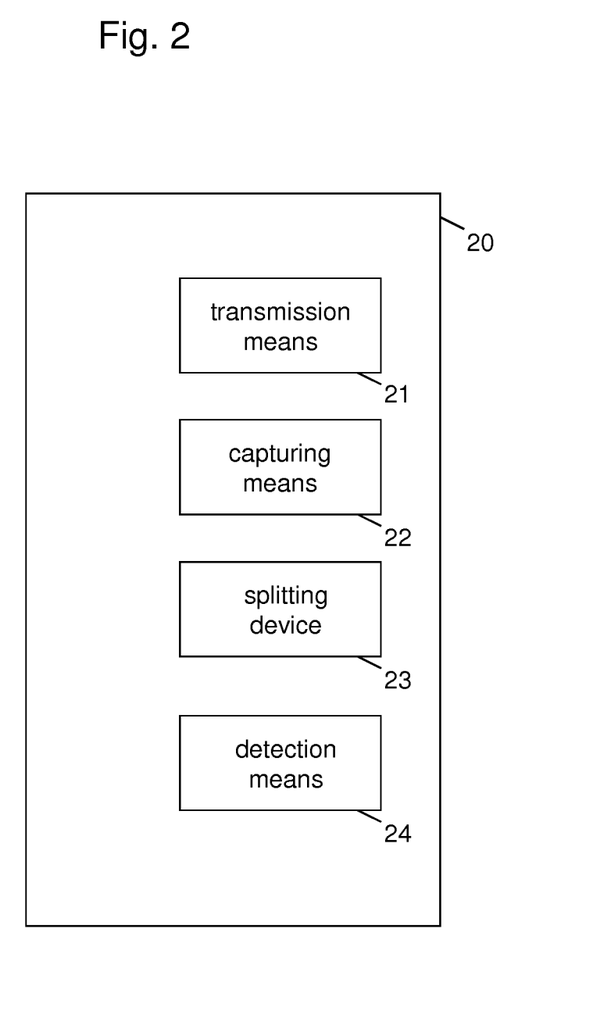
FIG. 2 shows a principle architecture of an example for an apparatus according to certain embodiments of the present invention.

FIG. 2 shows a principle configuration of an example for an apparatus according to certain embodiments of the present invention.

The apparatus 20 comprises a transmission means 21 adapted to transmit a signal to a line to be tested, a capturing means 22 adapted to capture a forward signal of the signal and a reverse signal of the signal, a splitting device 23 adapted to separate the reflection of the signal in time domain via cross correlation of the forward signal and the reverse signal, and a detection means 24 adapted to detect a distance to fault in the line by searching and processing maximum peak position of the captured and separated signals. The basic system architecture of the implementation is illustrated in FIG. 3.

Figure 3:
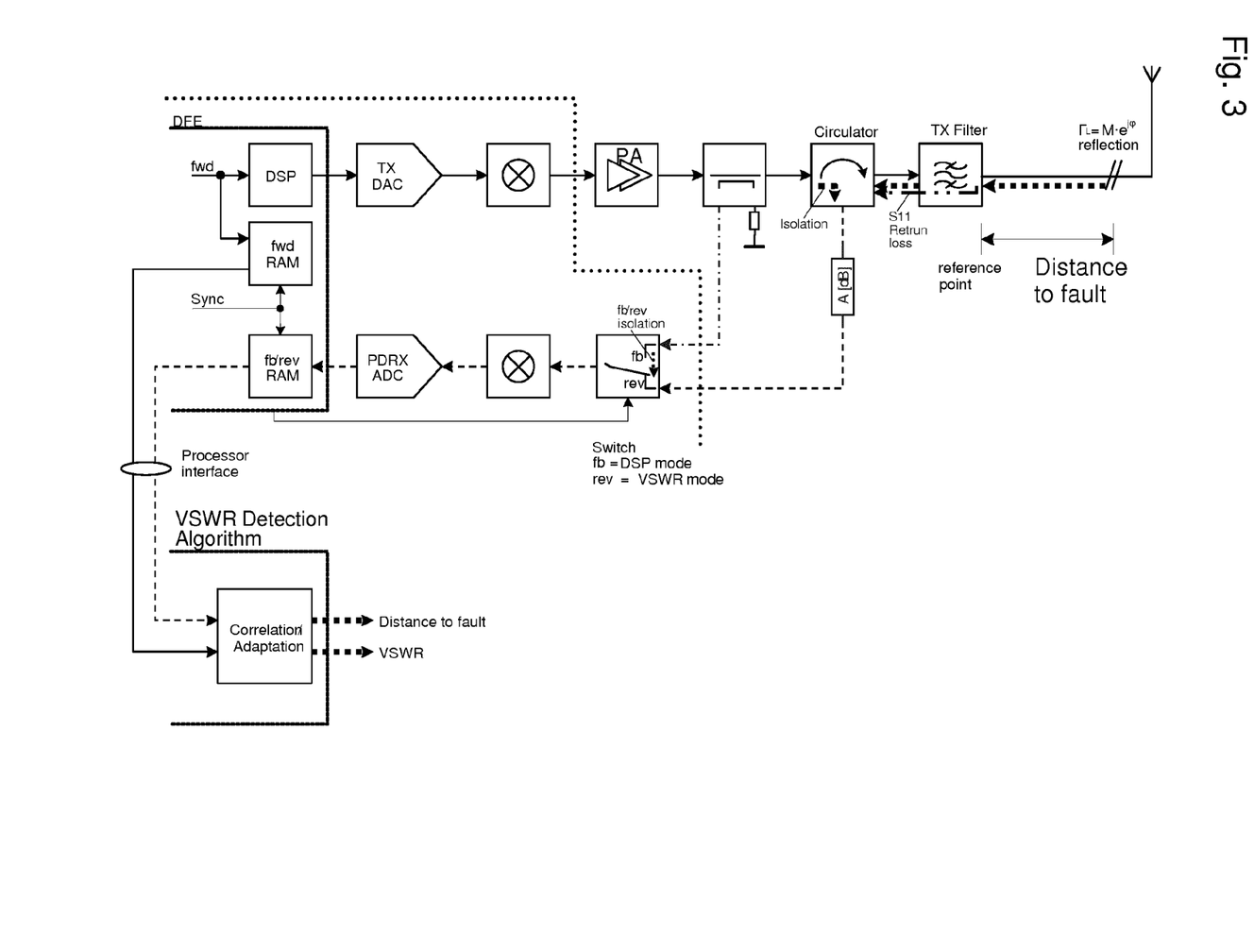
FIG. 3 shows a basic system architecture of the implementation according to certain embodiments of the present invention.

The architecture illustrated in FIG. 3 shows the basic forward transmission chain from the digital front end (DFE) up to the antenna and a VSWR receiver (PDRX), which is also suitable for any digital signal processing. The reflection represented by Gamma-L on the antenna line is accompanied by a reverse signal traveling back to the transmitter. A circulator as splitting device separates the reverse signal from the forward signal and provides it to the VSWR receiver (PDRX) for further capturing. The reverse signal is captured simultaneously with the forward signal and thereby, allows for cross correlation based post-processing with respect to VSWR (return loss) and distance to fault detection.

VSWR and distance to fault detection are related to a reference point gained during calibration.

The RF HW architecture as shown in FIG. 3 introduces additional effects impacting the detection of the maximum peak search in the cross correlation results. One major effect is the directivity for separating reverse and forward signals. This is caused by the isolation of the splitting device (circulator or coupler) and by the return loss (S11) of the TX filter (duplex filter). The VSWR detection algorithm tries to gain any knowledge of these effects, which partly allow for their cancellation, and thus improves the detection of the actual reflection peak within the cross correlation result. The prediction of the cancellation signal is based on adaptation in terms of adaptive filter estimation. The estimated coefficients are applied to the forward signal and the result is cancelled from the captured reverse signal.

According to exemplary embodiments of the present application, estimation of leakage (isolation and S11 return loss) and its cancellation is performed via an adaptive filter, which enables improvement of directivity. Thereby, a circulator with a certain isolation, a duplex filter with a certain S11 (return loss) and a switch (isolation is negligible) may be used.

For distance to fault detection it is also possible to put the splitting device, such as a coupler or a circulator, at the antenna output.

According to certain embodiments of the present invention, the voltage standing wave ratio detection in the time domain reflectometer mode is based on correlation in time domain. Thereby, adaptive filter estimations may be carried out to cancel leakages.

As hardware for the voltage standing wave ratio detection in the time domain reflectometer mode, a splitting device for reverse signal, such as a circulator or a coupler, a VSWR receiver PDRx, and capture RAM with simultaneous capturing of Tx/PDRx may be used according to certain embodiments of the present invention.

According to exemplary embodiments of the present invention, the following accuracy requirements may be set for VSWR detection.

VSWR/return loss:
  Accuracy: return loss RL±2.6 dB/0 ... 360° (Pout>25 dBm)
  Related to antenna connector
Distance from the antenna connector to the major fault on the antenna line:
  Accuracy: ±6% of cable length plus ±3.6 m;
  Values depend on sampling rate (fs) and velocity factor (VF), and are provided for fs=153.6 MHz, VF=0.8 ... 0.9.

According to certain embodiments, the calibration is carried out during manufacturing. Thereby, a reference point is set by applying a well defined reflection to the module output.

During normal operation of the VSWR detection, simultaneous capturing of forward and reverse signals is carried out. This enables improvement of directivity by estimation of the leakage from the forward to the reverse path and cancellation from the captured reverse reception PDRx data, which, however, can be skipped for certain scenarios. Further, separation of the reflection in time domain via cross correlation of forward and leakage-free reverse signal and maximum peak search is carried out, wherein
  Maximum peak magnitude=>return loss RL
    RL~$pk_{reflection}/pk_{reference}$ [dB]=−20·log 10($c_{pk}$·$pk_{reflection}/pk_{reference}$) in which:
    $c_{pk}$ represents the currently adjusted nominal power
    $pk_{reference}$ from calibration
  Maximum peak position=>distance to fault
    s=½·VF·c·n·Ts
    in which:
    n=number of taps, i.e. difference of the positions of $pk_{reflection}$ and $pk_{reference}$
    Ts=tap spacing
    c~3e8 m/s
    VF~0.8 ... 0.9 (velocity factor).
Group delay of front end filter may be considered as offset.

Figure 4A:
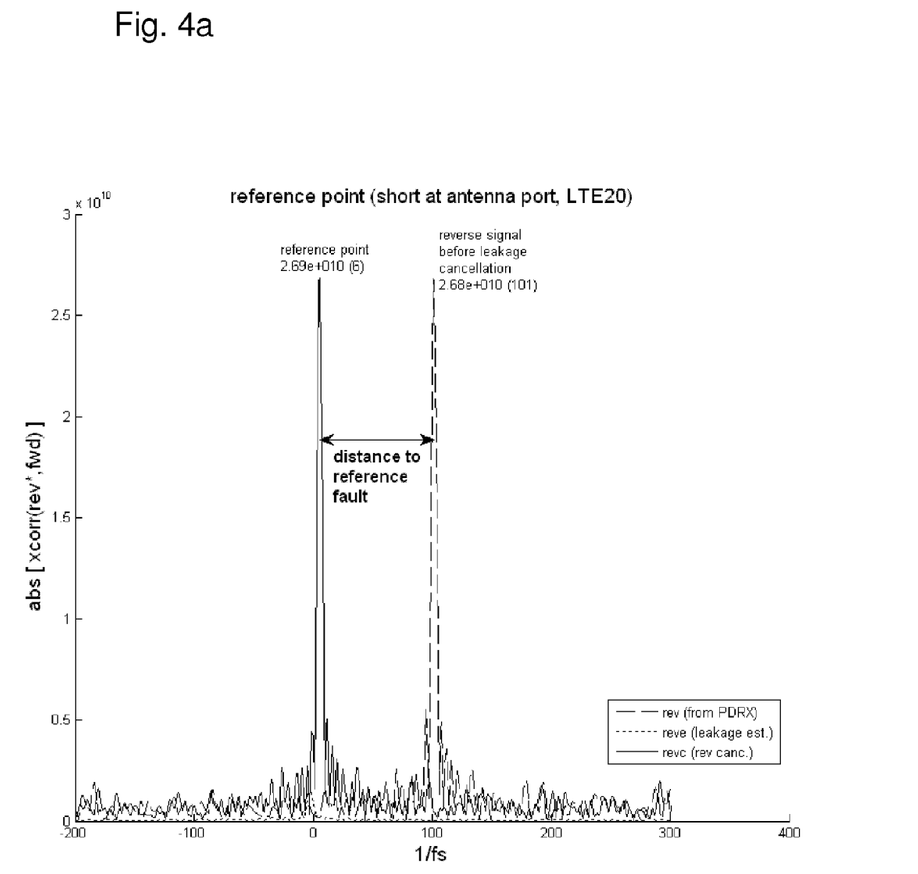
FIGS. 4a, 4b and 4c show graphs indicating an example of the distance to fault derivation from correlation result.
Figure 4B:
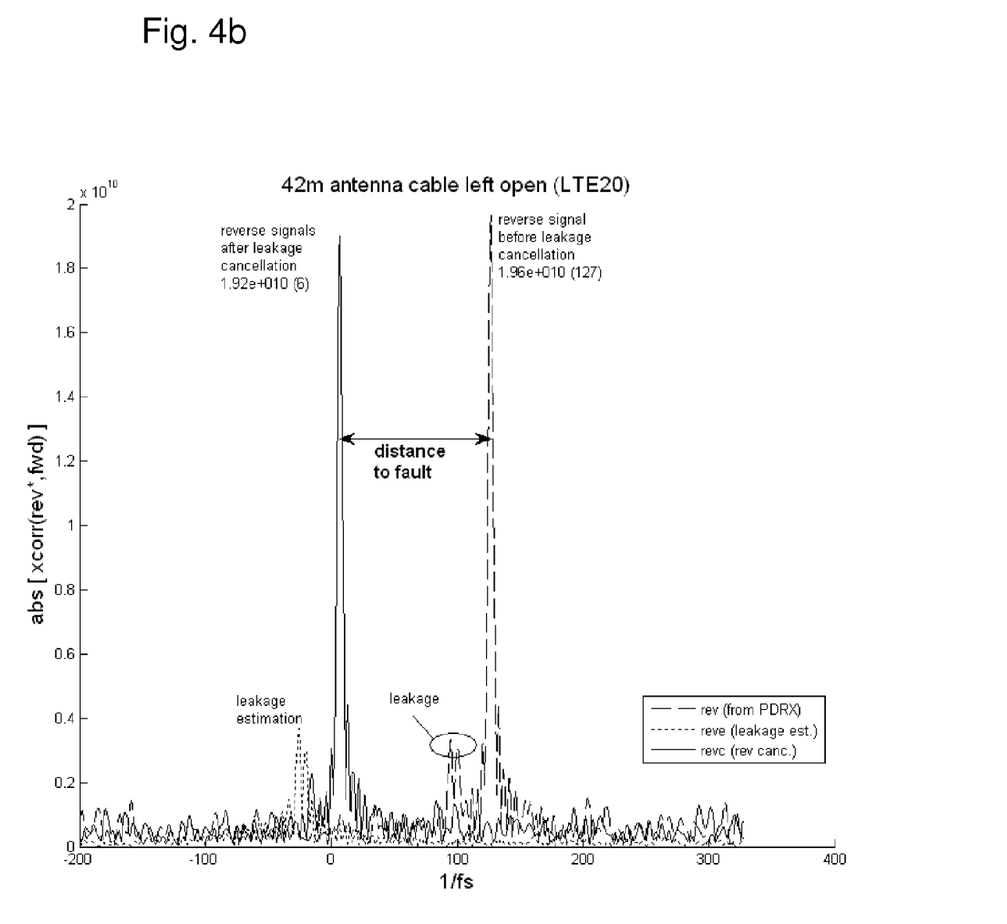
Figure 4C:
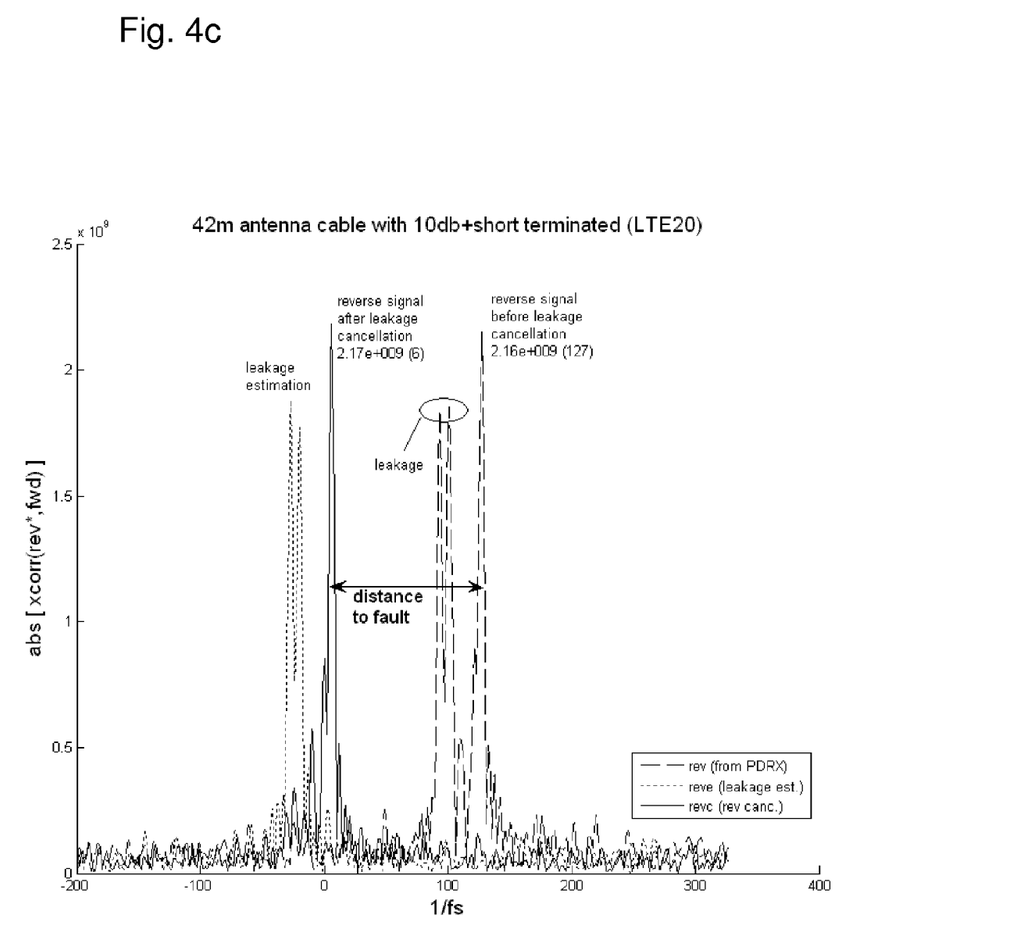

FIGS. 4a to 4c show an example in which certain embodiments of the present invention are applied. In the present example, LTE20 with internal leakage cancellation with 31 complex finite impulse response (FIR) coefficients in time domain (hfefs11/hcirc in common as one FIR coefficient set) is used. The graphs depicted in FIG. 4 show the distance to fault derivation from correlation result and the cancellation principle.

FIG. 4a shows the cross correlation result of the captured forward and reverse signals during reference point calibration. For calibrating, a total reflection is applied to the antenna connector; in this case a short. The right peak (rev) represents the total reflection without leakage cancellation; the left peak (revc) represents the reflection with forward to reverse leakage (crosstalk) cancellation. In this particular case the estimated leakage (reve) is much smaller than the reflection itself and can be neglected. The distance between both peaks serves as reference distance (see also FIG. 3).

FIG. 4b shows the cross correlation result of an open, 42 meter long antenna cable. The open causes total reflection, and thereby the VSWR fault. By comparing the current distance to the fault against the reference distance from FIG. 4a the propagation time can be derived in units of taps. According to the equation above the actual distance to the fault (the open antenna line) can be calculated. The forward to reverse path leakage (crosstalk) is negligible, but already visible and applied.

FIG. 4c shows a similar scenario like FIG. 4b, but with an antenna matching of about 20 dB. The leakage is nearly as strong as the reflection itself. After leakage cancellation the actual peak of the reflection (revc) is clearly visible. The actual distance to the fault can be calculated the same way as for FIG. 4b.

The benefits of the present inventions are cost reduced radio frequency RF architecture for VSWR detection which enables distance to fault detection, this improving serviceability. Furthermore, reduction of detection failures in case of co-located carriers is enabled.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under GSM, HSDPA, UMTS, LTE, WCDMA, WIMAX and WLAN and can advantageously be implemented also in controllers, base stations, user equipments or smart phones, or personal computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
BTS: base transceiver station
FDD: Frequency Division Duplex
TDD: Time-Division Duplex
VSWR: Voltage standing wave ratio
RF: Radio Frequency
HW: Hardware
ADC: Analog to Digital Converter
DAC: Digital to Analog Converter
DSP: Digital Signal Processing

What is claimed is:

1. A method, comprising:
    detecting a voltage standing wave ratio at least by:
        transmitting a signal to a line to be tested;
        capturing a forward signal of the signal;
        capturing a reverse signal of the signal; and
        separating a reflection of the signal in a time domain via cross correlation of the forward signal and the reverse signal; and
    detecting a distance to fault in the line by searching and processing maximum peak position of the captured and separated signals, wherein detecting the distance to fault is performed by processing performed to detect the voltage standing wave ratio, wherein the voltage standing wave ratio and the distance to fault detection are related to a reference point gained at calibration during manufacturing, and wherein the reference point was set by applying a defined reflection to a forward transmission chain, and
    wherein the distance to fault is directly measured by network radio equipment comprising the forward transmission chain, and the forward signal and the reverse signal are simultaneously captured by hardware of the network radio equipment.

2. The method according to claim 1, further comprising estimating a leakage from the forward to the reverse path for cancellation from the captured reverse reception data.

3. The method according to claim 2, wherein estimating the leakage and its cancellation is carried out via an adaptive filter.

4. The method according to claim 1, wherein separating the reflection of the signal is performed via a splitting device.

5. The method according to claim 4, wherein the splitting device is a coupler or a circulator.

6. The method according to claim 4, wherein the splitting device is located at an input or an output of a duplex filter.

7. The method according to claim 4, wherein the line to be tested is an antenna line, and the splitting device is located at an antenna output.

8. The method according to claim 1, wherein the forward signal and the reverse signal are simultaneously captured.

9. The method according to claim 1, wherein the distance to fault information is transmitted to a maintenance network element.

10. The method of claim 1, wherein the detecting a distance to fault in the line further comprises determining an actual distance to a fault by comparing a current distance to fault based on the detecting against a reference distance corresponding to the reference point.

11. The method of claim 10, wherein the actual distance to the fault, s, is determined using the following:

$$s = \tfrac{1}{2} \cdot VF \cdot c \cdot n \cdot Ts,$$

in which n=a number of taps corresponding to a difference of positions of a current reflection peak and a reference peak corresponding to the reference point, Ts=tap spacing, c~3e8 m/s, and VF~0.8 ... 0.9 and is a velocity factor.

12. The method of claim 1, wherein separating a reflection of the signal in a time domain farther comprises determining a return loss, RL, using the following:

$$RL \sim pk_{reflection}/pk_{reference} \text{[in dB]} = -20 \cdot \log_{10}(c_{pk} \cdot pk_{reflection}/pk_{reference}),$$

in which $pk_{reflection}$ is a peak magnitude of a current reflection peak, $pk_{reference}$ is a peak magnitude of a reference reflection peak corresponding to the reference point, and $c_{pk}$ represents a currently adjusted nominal power.

13. An apparatus, comprising:
    network radio equipment comprising a forward transmission chain;
    at least one memory comprising computer readable code; and
    at least one processor;
    the at least one memory and the computer program code configured, with the at least one processor, to cause the apparatus to perform at least the following:
        detect a voltage standing wave ratio at least by:
            transmit a signal to a line to be tested;
            capture a forward signal of the signal and a reverse signal of the signal; and
            separate the reflection of the signal in time domain via cross correlation of the forward signal and the reverse signal; and
        detect a distance to fault in the line by searching and processing maximum peak position of the captured and separated signals, wherein detecting the distance to fault is performed by processing performed to detect the voltage standing wave ratio, wherein the voltage standing wave ratio and the distance to fault detection are related to a reference point gained at calibration during manufacturing, and wherein the reference point was set by applying a defined reflection to the forward transmission chain,
    wherein the distance to fault is directly measured by the network radio equipment, and the forward signal and the reverse signal are simultaneously captured by hardware of the network radio equipment.

14. The apparatus according to claim 13, wherein the at least one memory and the computer program code are further configured, with the at least one processor, to cause the apparatus to perform at least the following: estimate a leakage from the forward to the reverse path and cancel the leakage from the captured reverse reception data.

15. The apparatus according to claim 14, wherein:
the at least one memory and the computer program code are further configured, with the at least one processor, to cause the apparatus to perform at least the following: leakage; and
the cancelling of the leakage is carried out via an adaptive filter.

16. The apparatus according to claim 13, wherein a splitting device as one of a coupler or a circulator performs the separating of the reflection of the signal in the time domain.

17. The apparatus according to claim 16, wherein the splitting device is located at an input or an output of a duplex filter.

18. The apparatus according to claim 16, wherein the line to be tested is an antenna line, and the splitting device is located at an antenna output.

19. The apparatus according to claim 13, wherein the apparatus comprises a base transceiver station and wherein the at least one memory and the computer program code are further configured, with the at least one processor, to cause the apparatus to perform at least the following: detect the distance to fault by direct measurement by the base transceiver station.

20. The apparatus according to claim 13, wherein at least one memory and the computer program code are further configured, with the at least one processor, to cause the apparatus to perform at least the following: transmit the distance to fault information to a maintenance network element.

21. A computer program product comprising a non-transitory a computer-readable medium having software code portions which, when the software code portions are executed by an apparatus, are configured to cause the apparatus to perform operations comprising:
    detecting a voltage standing wave ratio at least by:
        transmitting a signal to a line to be tested;
        capturing a forward signal of the signal;
        capturing a reverse signal of the signal; and
        separating a reflection of the signal in a time domain via cross correlation of the forward signal and the reverse signal; and
    detecting a distance to fault in the line by searching and processing maximum peak position of the captured and separated signals, wherein detecting the distance to fault is performed by processing performed to detect the voltage standing wave ratio, wherein the voltage standing wave ratio and the distance to fault detection are related to a reference point gained at calibration during manufacturing, and wherein the reference point was set by applying a defined reflection to a forward transmission chain,
    wherein the distance to fault is directly measured by network radio equipment comprising the forward transmission chain, and the forward signal and the reverse signal are simultaneously captured by hardware of the network radio equipment.

* * * * *

UNITED STATES PATENT AND TRADEMARK OFFICE
CERTIFICATE OF CORRECTION

PATENT NO. : 9,755,673 B2  Page 1 of 1
APPLICATION NO. : 14/437908
DATED : September 5, 2017
INVENTOR(S) : Jan Hellmann et al.

It is certified that error appears in the above-identified patent and that said Letters Patent is hereby corrected as shown below:

In Claim 2:
Column 7, Line 54, "the" should be deleted.

In Claim 12:
Column 8, Line 21, "farther" should be deleted and --further-- should be inserted.

In Claim 14:
Column 8, Line 67, "the" should be deleted.

In Claim 15:
Column 9, Line 5, "leakage" should be deleted and --estimate the leakage-- should be inserted.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*